（12）United States Patent
Jertberg et al.

(10) Patent No.: US 10,459,443 B2
(45) Date of Patent: Oct. 29, 2019

(54) SEMI-AUTONOMOUS FARM TRANSPORT VEHICLE FOR PICKED PRODUCE

(71) Applicants: Erik Jertberg, Watsonville, CA (US); Raleigh Nielsen, Morgan Hill, CA (US); David Mason, Morgan Hill, CA (US)

(72) Inventors: Erik Jertberg, Watsonville, CA (US); Raleigh Nielsen, Morgan Hill, CA (US); David Mason, Morgan Hill, CA (US)

( * ) Notice: Subject to any disclaimer, the term of this patent is extended or adjusted under 35 U.S.C. 154(b) by 0 days.

(21) Appl. No.: 15/713,473

(22) Filed: Sep. 22, 2017

(65) Prior Publication Data

US 2019/0094857 A1    Mar. 28, 2019

(51) Int. Cl.
| | |
|---|---|
| *G05D 1/00* | (2006.01) |
| *B60P 3/00* | (2006.01) |
| *B60W 10/08* | (2006.01) |
| *G05D 1/02* | (2006.01) |

(52) U.S. Cl.
CPC .......... *G05D 1/0088* (2013.01); *B60P 3/007* (2013.01); *B60W 10/08* (2013.01); *G05D 1/0212* (2013.01); *B60W 2420/52* (2013.01); *G05D 2201/0201* (2013.01)

(58) Field of Classification Search
CPC .............. G05D 1/0088; G05D 1/0212; G05D 2201/0201; B60P 3/007; B60W 10/08; B60W 2420/52
USPC ......................................................... 701/23
See application file for complete search history.

(56) References Cited

U.S. PATENT DOCUMENTS

| | | | | |
|---|---|---|---|---|
| 5,421,148 | A | * | 6/1995 | Caraway ................ A01D 46/24 406/106 |
| RE35,150 | E | * | 1/1996 | McKenna, Jr. ...... A01D 46/243 56/328.1 |
| 2008/0294309 | A1 | * | 11/2008 | Kaprielian ........... A01B 69/008 701/27 |
| 2013/0197767 | A1 | * | 8/2013 | Lenz ...................... A01B 63/00 701/50 |
| 2016/0157429 | A1 | * | 6/2016 | Pitzer ..................... A01D 46/30 701/23 |
| 2017/0139418 | A1 | * | 5/2017 | Hiramatsu ................ B60T 7/22 |

FOREIGN PATENT DOCUMENTS

JP             06343334 A   * 12/1994

* cited by examiner

*Primary Examiner* — Marthe Y Marc-Coleman
(74) *Attorney, Agent, or Firm* — Brooks, Cameron & Huebsch, PLLC

(57) ABSTRACT

The present disclosure includes, systems, methods, and devices provided for transporting produce from at least one row of plants to a distribution location in a field including a frame for carrying the picked produce from the at least one row of plants, at least three wheels coupled to the frame, at least one motor coupled to at least one of the wheels, a power unit connected to the frame, at least one proximity sensor coupled to both the front side and back side of the frame to identify movement of the human, and a control unit connected to the frame and coupled between the motor, at least one sensor, and the power unit to autonomously move the transport when the sensors identify a predefined condition in the field.

25 Claims, 4 Drawing Sheets

SEMI-AUTONOMOUS FARM TRANSPORT VEHICLE FOR PICKED PRODUCE

BACKGROUND

The present disclosure relates to a vehicle for moving picked produce and in particular to a method and system for a semi-autonomous vehicle to transport picked produce from a row of plants in a field to a distribution location.

For centuries, produce has been grown from a field of rows that define a farmer's land. The produce is harvested by people (called pickers) hand picking the ripe produce in each row. This is a slow and tedious process that is not well suited for commercial operations, but allows the farmer to obtain the best produce from their crop.

The pickers place the picked produce into a small container and carry it to a farm road for collection several times a day. The produce carried to the farm road (or a distribution location) is collected by a tractor or truck for delivery to the processing plant. The process of filling a container with picked produce and walking or running the container to and from a distribution location at the end of a row for delivery repeats all day and is physically exhausting.

A row of ripe produce for picking may be hundreds of feet long, so it can take a few minutes to walk a container to and from the road. Thus, the average picker spends about thirty percent of his day walking to and from the road with full or empty containers. On a given day during harvest, a farmer may have over a hundred pickers in the field.

In certain areas, the demand for manual labor during the relatively short picking season has placed a strain on the available labor pool. Current labor rates also place a strain on profit margins so, therefore, the need has arisen for apparatus capable of assisting the pickers to harvest substantial acreage of produce per unit of time in an acceptable manner without damaging the fruit and/or injuring the pickers.

Over the years, various farmers and companies have tried to automate the produce picking and delivery process with a large gas powered system. For example, GK Machine developed the Mercado system that spans five rows to carry picked strawberries, and Agrobot and Harvest Crew Robotics developed tractors to pick and carry strawberries from a row of plants. Unfortunately, these systems, like many other large scale machines that have tried to reduce or eliminate the work of a picker, are rarely used for various reasons, including: cost to manufacture and repair, increased fruit damage and decreased fruit quality during picking and transport, noise and pollution, inability to function in different terrain and weather conditions, constraints on labor force, etc. Thus, there is a need for a small, quiet, reliable and individualized electric vehicle that can transport the produce to and from the pickers so that the pickers can maximize their time to collect the best produce possible in the shortest amount of time and with the least amount of physical effort.

The background description provided herein is for the purpose of generally presenting the context of the present disclosure. Work of the presently named inventors, to the extent the work is described in this background section, as well as aspects of the description that may not otherwise qualify as prior art at the time of filing, are neither expressly nor impliedly admitted as prior art against the concepts of this present disclosures.

DETAILED DESCRIPTION

Figure 1:
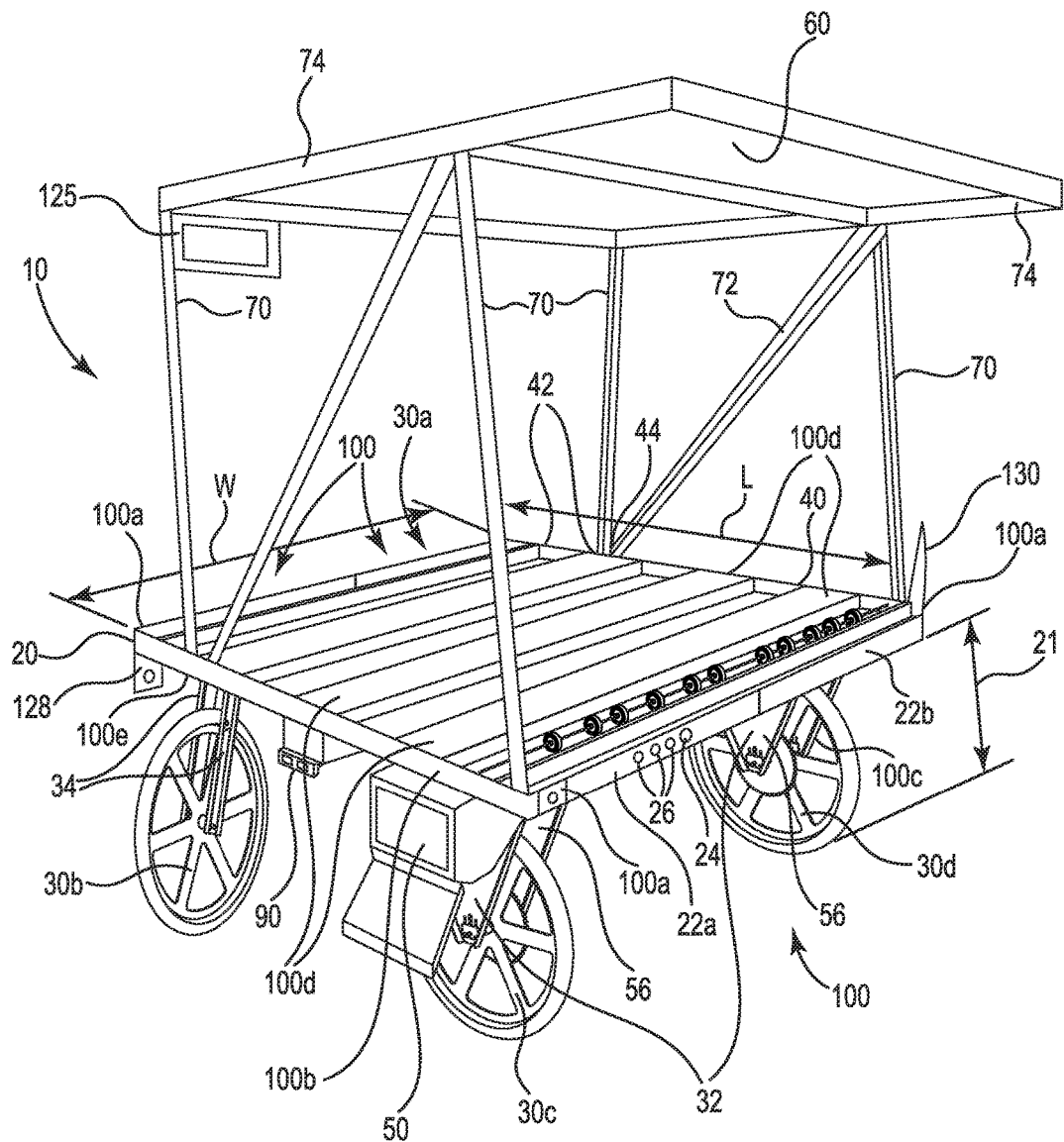
FIG. 1 illustrates a perspective view of a semi-autonomous transport vehicle used to move over a row of produce to be picked in accordance with one or more embodiments.

Various embodiments disclosed herein are directed to a semi-autonomous vehicle for transporting produce picked from a plant in a field to a distribution location. Produce can be, by way of example and not by way of limitation, things that have been produced or grown, especially by farming. Similarly, a distribution location, by way of example, can be a dirt or paved location near the end of a row of plants. Such techniques in accordance with one or more embodiments allow growers, especially outdoor growers, to achieve enhanced productivity by their pickers and higher quality of produce, while reducing the physical activity of the picker. The technique for using the semi-autonomous vehicles is also scalable, allowing users to implement as much or as little automation as needed. Accordingly, the foregoing description and attached drawings are by way of example only, and are not intended to be limiting.

Generally, the semi-autonomous transport vehicle includes a frame with wheels to carry full or empty containers used to harvest the produce picked by a farm worker (e.g., picker) in the field. A control system on the frame communicates with electrical components to move or stop the transport for various reasons including: 1) sensors on the transport provide data about the picker's movement, transport's weight, energy, hardware, surroundings, and location; 2) the communication unit on the transport receives instructions from a remote station; and 3) a physical device on the frame activates the transport or instructs the transport to move or stop. Given that the vehicle transports produce from a field, all standard weather proofing requirements apply to the vehicle.

An embodiment present disclosure provides an electric powered semi-autonomous transport vehicle for assisting a person picking produce from a field. Another embodiment provides an autonomous produce transport vehicle programmed to follow a picker in a row and deliver the picked produce to the distribution location.

Yet another embodiment is to provide a produce transport vehicle that can recognize when a desired amount of produce has been received by the transport. A further embodiment is to operate the transport vehicle manually or remotely. Another embodiment provides a rugged and durable electric transport vehicle that spans a row of plants or moves between each row of plants.

In accordance with one or more embodiments, a weather proofed device for transporting produce picked by a human from at least one row of plants in a field is provided having a frame for carrying the picked produce from the at least one row of plants. The frame couples to at least one motor, three wheels, a rechargeable power unit, at least two proximity sensors, and a control unit. The control unit couples between the motor, sensors, and rechargeable power unit to autonomously move the transport when the sensors identify a predefined condition in the field.

In accordance with one or more embodiments, a system for transporting produce picked by a human from at least one row of plants in a field is provided having a semi-autonomous electric transport vehicle and a remote control station. The vehicle includes a frame coupled to at least one motor, three wheels, a rechargeable power unit, two proximity sensors, and a control unit. The control unit can, for example, couple between the motor, sensors, and rechargeable power unit to move the transport when the sensors identify a predefined condition in the field. The remote control station communicates with the vehicle to exchange data.

In accordance with one or more further embodiments, a method is provided for moving produce picked by a person from at least one row of plants in a field to a distribution location with a semi-autonomous transport vehicle having a platform. The platform autonomously moves the vehicle to the field location of the person in the at least one row to receive the picked produce on the platform; senses with a proximity sensor on the vehicle when the person moves; autonomously moves the vehicle to follow the person after the step of sensing; receives weight data with a sensor on the vehicle to recognize received produce on the platform; autonomously transports the collected produce with the vehicle to the distribution location for removal; and repeats steps (a) through (e) with the vehicle until the picked produce has been transported to the distribution location from the at least one row of plants in the field.

In the embodiment illustrated in FIG. 1, the inventive semi-autonomous transport 10 provides a frame 20 that moves over a row of plants with wheels 30a, 30d touching the ground on one side of the row and wheels 30b, 30c touching the ground on the other side of the row. The wheels 30a-d connect to frame 20 using means, like forks 32 and swivels (i.e., a swivel mechanism and a wheel) 34, to provide a minimal height 21 of the frame 20 above the ground and plants. In some embodiments, each swivel 34 can be locked in place to move transport 10 in a desired direction or unlocked to freely turn.

Frame 20 includes two tubes 22a and 22b (e.g., 'C' shaped tubes) that slide into each other to form a desired square or rectangular shape to accommodate the size of the row being harvested. A removable pin 24 placed through one of a number of predetermined holes 26 at the ends of each tube 22a and 22b defines the width W of frame 20. Therefore, width "W" can be lengthened or shortened, depending on the placement of the removable pin 24 in one of the predetermined holes 26. In some embodiments, the frame, for example, can be adjustable between 48 to 72 inches wide to allow the wheels 30a-d to touch the ground on either side of a row of plants to be picked. In various embodiments, the length of the frame (e.g., length 'L' of frame 20) is 72 inches to accommodate about 20-40 stacked containers, however length 'L' may be sized differently, for example between 30 and 72 inches long, to accommodate more or less containers of different sizes. In an alternative embodiment, the width 'W' of the frame may be more than fifteen feet to extend over more rows (e.g., 3 rows of plants and allow at least three pickers to harvest 3 to 5 rows of plants with produce).

Figure 2A:
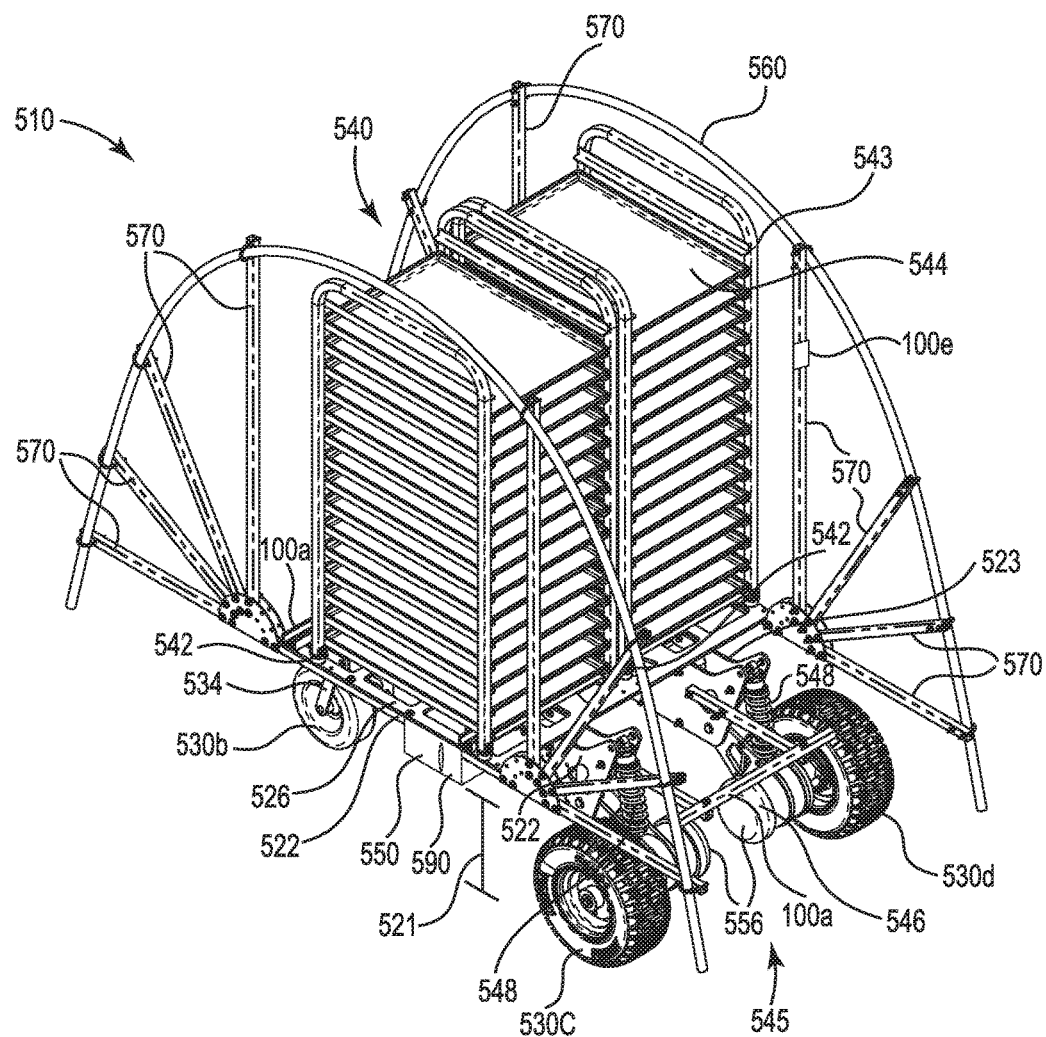
FIGS. 2A and 2B illustrate perspective views of a semi-autonomous transport vehicle used to move between two rows of produce to be picked in accordance with one or more embodiments.
Figure 2B:
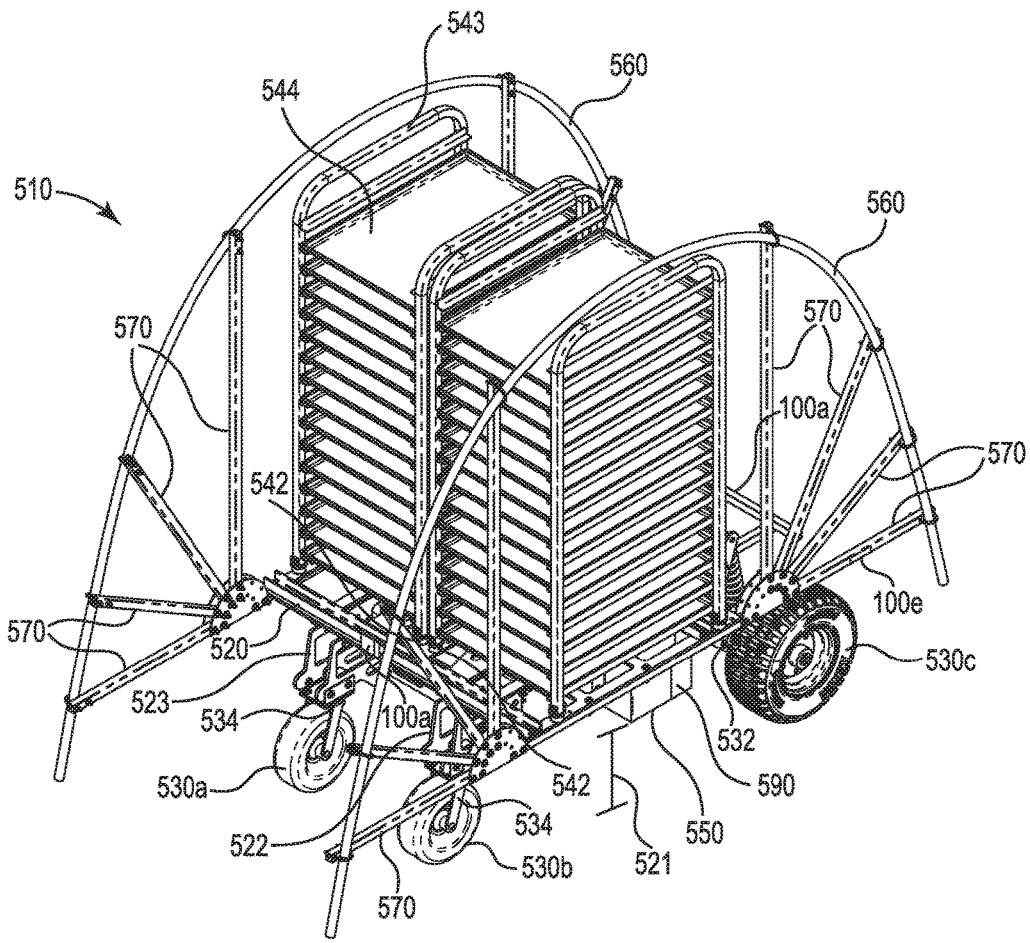

In contrast to the embodiment of FIG. 1, the embodiment illustrated in FIGS. 2a and 2b provides a transport 510 with a frame 520 and wheels 530a-d that fit between two rows of plants over uneven terrain or rocks. In this embodiment, left and right side frame structures 522, 523 connect with a frame plate 526. Left side frame structure 522 couples the left side tires 530b /530c with suspension 545, motor 556 and swivel 534. Similarly, right frame structure 523 couples right side tires 530a /530d with suspension 545, motor 556 and swivel 534. In some embodiments, frame 520 will have a width W and length L of between about 24 and 42 inches so that transport 10,510 can move between 2 rows of plants. Wheels 530c,530d can be coupled to frame 520 using a pivot arm 546 and shock 548 or spring system (not shown) to manage the terrain and load being transported. The desired suspension system would minimize slippage by the wheels and rough motions caused by the terrain as the transport moves through the field.

The height 521 between the bottom of frame 520 and the ground will be between 6 and 24 inches to provide the transport 500 with a low center of gravity, and yet enough clearance to move over the ground and between the rows of plants where the picker is working. When an embodiment, such as that shown in FIGS. 2a and 2b is used for large plants, the bottom of the frame may, for example, be between about 36 and 52 inches off the ground. Similar to the embodiment shown in FIG. 1, a different tire size and/or different pivot arm/shock mechanism may be attached to change the height of the frame. For each embodiment, the ability to adjust the height will help the picker to move the picked produce to or from the transport whether he is kneeling, standing or something in between while working.

When such an embodiment is used with small plants, the bottom of the frame (e.g., frame 20 of FIG. 1) can, for example, have a height of between about 24 and 52 inches off the ground so that the transport can move over the plants while traveling up and down a row. When such an embodiment is used for large plants, the bottom of the frame can, for example, be between about 36 and 58 inches off the ground. The height of frame may be adjusted before or during use to accommodate the terrain or the height of the plants. The height of frame can be changed by attaching different size wheels and/or longer fork sections, in some embodiments.

In some embodiments, the legs can have different lengths and/or can be adjustable and/or different wheels can be used such that the transport can be used on inclined farming surfaces such that the frame is maintained in a generally horizontal condition, while the terrain is not horizontal. In some embodiments, the legs can be adjusted as the transport is moving, for example, based on motion and/or inclination sensors to maintain a threshold inclination on the frame.

One of ordinary skill in the art would appreciate that the left and right tires or with swivels, as discussed above, could be replaced with a single tire and swivel (not-shown) connected to the frame in a central location to accommodate a balanced three wheel structure. The single tire could be coupled to the motor to pull the transport or the two other tires could have motors to pull or push the transport. In addition, all wheels could be mounted with forks and electric motors (not shown) to create a three or four wheel drive transport vehicle. The frame in each embodiment can be made of any sturdy material, like PVC, steel, or aluminum or a combination of suitable materials.

Figure 5A:
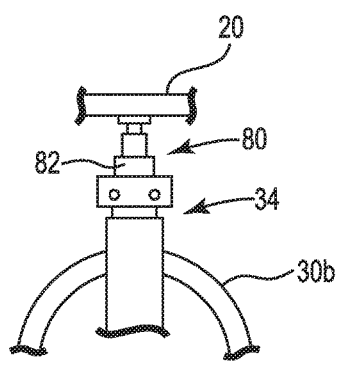
FIG. 5A and 5B provide cut-away views illustrating how a telescoping mechanism could be coupled to an embodiment of the present disclosure.
Figure 5B:
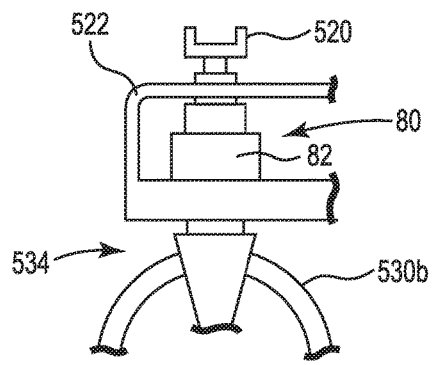

In embodiments such as those shown in FIGS. 1 and 2a and 2b, a vertical telescoping or expandable mechanism 80 as illustrated in FIGS. 5a and 5b could be added between frame 20 or frame plate 526 and wheels 30a-d or 530a-d, respectively. A mechanical pin and hole type of structure (not shown) or controller 50,550 coupled to an actuator 82 within the vertical telescoping mechanism 80 could be implemented to allow the user of the transport to adjust the height of the frame under any or all wheels without replacing the tires. This feature would allow the frame to be lifted or lowered to assist with loading or unloading of produce, and could be used to keep the frame level when the transport moves over uneven or sloped terrain to prevent produce bunching or falling off. With respect to the first embodiment of FIG. 1, FIG. 5a illustrates a cutaway view of how a vertical telescoping mechanism could be connected between the frame and a swivel or fork (not shown) holding a wheel. With respect to an embodiment, such as those shown in FIG. 2a and FIG. 2b, FIG. 5b illustrates how the vertical telescoping mechanism could connect between frame plate and frame structures (e.g., structures 522 and 523) above or between each swivel and suspension.

Figure 3:
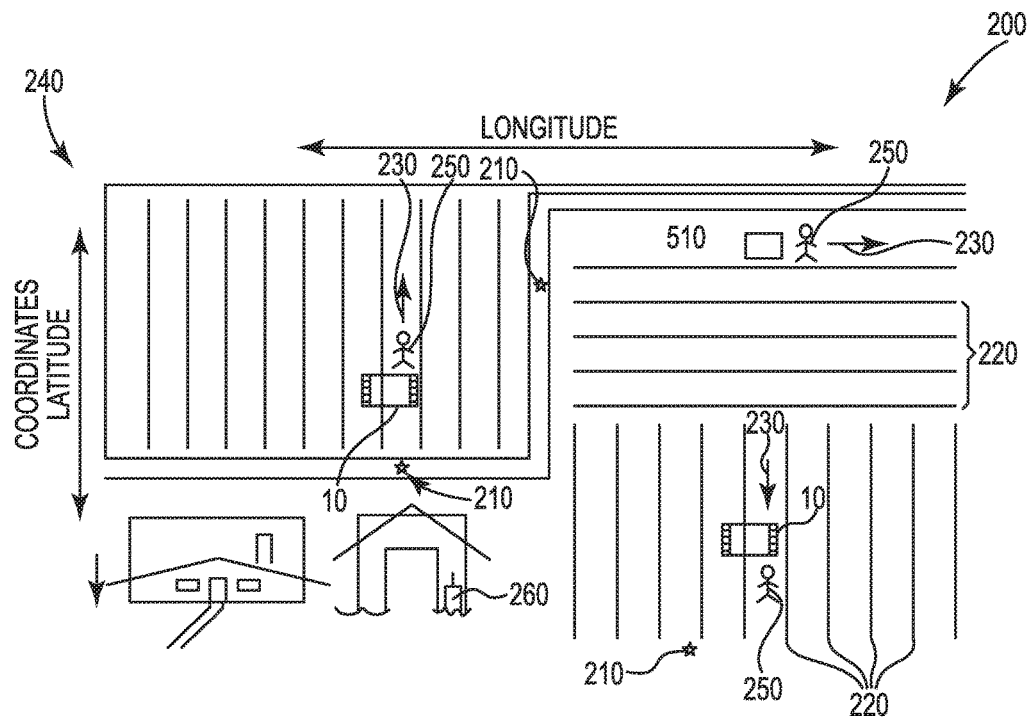
FIG. 3 is high-level diagram illustrating an example of an automated plant transport operation in accordance with one or more embodiments.

With respect to the embodiments shown in FIG. 1 and FIGS. 2a and 2b, on top of frame 20, 520, a platform 40, 540 can be secured, for example, by a quick release mechanism 44, 544, respectively. Although the illustrated embodiment shows a bolt, other mechanisms could be used including a latch, hook, screw, or Velcro. In the embodiment of FIG. 1, platform 40 provides a roller structure to allow the picker to easily move an empty or full container of produce (not shown) onto the transport vehicle 10. In an alternative embodiment, platform 40 may have one or more weighing stations 42 within platform 40 or the entire platform 40 may be a weighing station. Pressure sensors 100d couple to controller 50,550 and connect between frame 20,520 and weighing stations 42 to allow the picker and farmer to know how much produce they have picked during the day and when transport 10,510 will need to return to the distribution location 210 (FIG. 3).

In some embodiments, a shade structure 60 attaches to frame 20. This can be accomplished, for example, with one or more stay structures 70, 72, 74 that can be attached, for example, by any suitable means such as screws, rivets, or welds. In some such an embodiments, two vertical stays 70 connect on each side of frame 20 with a cross stay 72 and top stay 74. The stay structures 70,72, 74 can be made from any sturdy material including steel, aluminum or plastic. Shade structure 60 can, for example, be made of a light weight cloth stretched between the top stays 74 to reduce the amount of UV light and heat that may impact the picked produce. The shade structure 60 could be positioned between about 26 and 60 inches above the platform 40. Alternatively, shade structure 60 could include a set of solar panels (not shown) to charge power unit 90. For example, 120 kW solar panels could be added to or used as shade structure 60. Solar panels 60 may provide transport 10 with a continuous power source while the transport is in use during the day. In addition, transport 10, 510 may include a fan to keep the picked produce cooler, or storage or cooler container connected to frame 20, 520, respectively, to keep tools, medical supplies or food and beverages.

One of ordinary skill in the art will appreciate that platform 40 can be a sheet of aluminum, multiple rods, a wire mesh, a rack system, or any other structure attached to the frame for holding the desired produce containers or trays. For example, FIGS. 2a,2b illustrate a platform 540 providing a rack system with a vertical support 543 and trays 544. Similarly, structure 70 could include an arch structure 570 as illustrated in FIGS. 2a,2b to deflect plants and/or hold a shade structure (not shown). A skilled artesian would appreciate that alternative embodiments of frame 20,520 may provide a platform to carry other small scale farming equipment like a sprayer, mower, tools or other items useful to the farmer/picker that could be used by the farmer/picker or operated by controller 50,550.

Electric motors 56, 556 connect to frame 20, 520 to move wheels 30c, 530c and 30d, 530d, respectively, when instructed by controller 50,550. Each electric motor 56, 556 may, for example, generate between 500-5000 watts. The size of the motor will depend on the size of the tires and wheels that the motors will turn, the maximum weight the transport can carry, the terrain, and the desired speed of the transport. The amount of power provided to each motor 56,560 from battery unit 90 will be managed by programming instructions provided to controller unit 50,550.

The controller unit 50,550 can be turned on to activate the transport 10,210 by a standard on/off switch (not shown), by remote manual control device 128, or by a presence sensor (not shown). For example, a presence sensor (one of sensors 100 shown on FIG. 1) senses that the user of the transport is within a threshold distance (e.g., 3 feet from the presence sensor on the transport) of the transport and this sensed indication is used to activate the transport or a portion of a system thereof. The controller 50/550 includes a computer processor (e.g., a central processing unit (CPU)) to receive and evaluate the data from the electronic components, and ultimately control any movement of or communication with the transport 10,510. If transport 10, 510 includes solar panels, for example, with the shade structure 60, controller 50,550 can also manage the generated solar power provided to the batteries.

Transport 10,510 can include a number of sensors such as sensors 100a-e including proximity sensors 100a, unique identification (herein after "ID") sensor(s) 100b, kill switch sensor(s) 100c, pressure sensors 100d, and inclination sensor(s) 100e. Proximity sensors 100a connect to the front and back side corners of frame 20,520 and provide information about the terrain and any movement of humans or animals around the transport to the controller 50. Proximity sensors may be of the type including ultrasonic, infrared, and vision, among other suitable types.

The ID sensors 100b connect to the frame to read machine-readable unique identifiers such as a bar code, quick response code, or RFID tag carried by a user. The ID sensors 100b can also be used to allow the user to turn on the transport 10, log time worked, and/or record produce picked, in some embodiments.

Kill switch sensors 100c connect to frame 20 and allow a user to turn off and stop transport 10, when necessary. Pressure sensors 100d connect between frame 20,520 and a weighing station 42,542 of platform 40,540 for the controller 50,550 to receive weight data of the produce put on the transport 10,510 by each picker. Inclination sensors 100e connect to the frame and couple to the controller 50,550 to monitor the orientation of the frame relative to a horizontal and vertical plane.

One of ordinary skill in the art should appreciate that the distance a proximity sensor can scan and the speed a motor can turn will vary depending on the type and size of sensor and motor used. For example, an alternative embodiment may use a vision sensor which can scan more than 10 feet. This allows the user to program controller 50,550 to follow or find the picker at a greater distance. Similarly, while a constant speed motor could be used, a variable speed motor may be used to allow the controller 50,550 to decrease or increase the speed of the transport when following the picker or traveling to and from the distribution location 210, respectively. For example, the speed of each motor 56,556 could also be controlled based on sensors 100, such as data about a change in the terrain, the movement of a picker, or a max or total payload being reached on the transport, among other data that could be used for such functionality.

Additionally, motors 55,556 may be servo motors to allow the user to receive data about the amount of torque required when moving the transport. Thus, the feedback from the motors can also direct the controller on how to control the transport, and the same information can be shared with the control station and used to calculate the amount of power needed along a route.

In the above embodiment, the proximity sensors 100*a* can be tied together (front and rear) to act as a team—if either one sees something, the controller 50,550 will stop the motor(s). Additional proximity sensors 100*a* connected to the front and back of transport 10,210 could be used to only follow the terrain while the other two proximity sensors 100*a* follow the picker.

Pressure sensors 100*d* may be used for multiple weighing stations 42,542 within platform 40,540. This will allow a picker on either side of the row to weigh their picked produce before or as they place it on the platform.

Similarly, inclination sensors 100*e* provide data for the controller to identify when the transport is moving over rough terrain or an object. This data can be shared with the controller station 260 to better understand the terrain and possibly why the produce volume or picker speed changes. With this inclination sensor 100*e* data, the controller 50,550 may also decide to take a different path to avoid the terrain change or elevate frame 20,520 in the front, back, side, or some combination by the telescoping mechanism 80 mentioned above to keep the frame 20,520 or platform 40,540 fairly level. Adjusting the frame 20,520 or platform 40,540 to be level or about level to a horizontal plane while the transport 10,510 travels on uneven terrain can, for example, reduce or minimize damage to the picked produce that would otherwise get bruised by moving around and bunching up.

The semi-autonomous transport vehicle 10,510 also includes a display 125, manual drive device 128, and communication unit 130. Display 125 connects to the transport 10 and provides the picker or user with useful information collected from the controller 50,550. For example, the display may provide the time, date, weight of produce picked, instructions for use, hours worked, location, alerts, radio, video, and other useful information and/or functionality to the farmer/picker.

The manual drive device 128 allows the user (farmer/picker/other farmer worker) to move or stop the transport through the controller 50,550. Manual drive device 128 may communicate with the controller 50 by wireless or hardwired instructions. The manual drive device 128 may also provide a button to 'start' transport 10,510, 'send' transport 10,510 to the distribution location, and 'alert' others of a problem with transport 10,510 or someone in the field, in some embodiments. The action of each button could be shared with display 125 on transport 10,510 and communicated with control station 260 (FIG. 3) via communication unit 130.

The communication unit 130 may use cellular, WiFi, an RF, and/or other suitable type of transmitter and receiver to allow the transport 10 or 510 to remotely transmit or receive data. For example, the communication unit 130 may receive data from the control station 260 (FIG. 3) to be shared on the display 125 about where the transport 10 or 510 will travel, production goals, break times, weather, announcements, software updates, etc. In turn, if a remote manual drive device 128 is used to move or stop the transport 10 or 510, the communication unit 130 will receive those instructions for the controller 50. Similarly, communication unit 130 may transmit data from the transport 10,510 to the control station 260 to provide GPS data, weight of transport, operational data of transport systems, and/or messages for the transport user, terrain data or images, and/or other suitable information that is to be transferred.

Such embodiments can help farmers limit the time a picker works in a field, for example, by thirty percent. The process to obtain such efficiencies is depicted in FIG. 3, and starts once the transport 10,510 arrives at or travels to a desired road or distribution location 210 on farm or field 200. The desired location 210 may be established by the control station 260 or a GPS tracker on the picker, for example, by sending a GPS map coordinate to the communication unit 130 of transport 10,510, so that the transport can autonomously travel to the GPS map coordinates. However, if transport 10,510 does not include communication unit 130, transport 10,510 would be physically positioned at distribution location 210 of the picker by the manual drive device 128 or by physically delivering the transport to the desired distribution location.

Once the transport arrives at the distribution location 210, a user can activate transport 10,510, for example, with a 'start' button. With transport 10,510 active, in some embodiments, the proximity sensors 100*a* can continually send distance data to controller 50,550. When controller 50,550 identifies a predefined condition (as described in more detail below) from the received proximity sensor data, the controller sends a related program command to move or stop the transport based on the identified predefined condition. A predefined condition can, for example, be one of the conditions including: a threshold distance from the picker, a threshold weight of the picked produce, a hardware malfunction (a malfunction that may render the transport immovable or inoperable), an instruction from an external source (remote device or control station), and a terrain condition (an object in the way of the prospective path of the transport, inclination data that indicates that the incline would be too high, data to indicate that the transport may not be moving).

In some embodiments, with transport 10,510 active, controller 50,550 can initiate one of the follow actions when at least one of the following predefined conditions occur with the transport: 1) turn off, if picker 250 or user or control station 260 activates the on/off switch for the transport 10,510, 2) continue following the picker if picker 250 moves more than a threshold distance (e.g., 3 feet away) from transport 10,510, or 3) return to distribution location 210 to have collected produce unloaded. The first action will not likely happen unless the picker is done working for the day or takes a break. The second action occurs as long as the transport has power and has not received other instructions from the controller. The third action occurs when the picker 250 manually activates the transport 10,510 by the manual drive device 128 to travel to the distribution location, or pressure sensor 100*d* provides data to controller 50,550 that transport 10,510 has reached a threshold weight (e.g., maximum weight) and needs to travel to the distribution location to be unloaded.

For example, in a one embodiment, a predefined condition may include when an object, for example a picker or user, appears more than 3 and less than 10 feet away from the transport, controller 50,550 turns on motors 56 using power supply 90 to follow the picker 250. For example, the transport 10,510 will stay about 5 feet behind the picker 250 in the row. A person of ordinary skill in the art would appreciate that the distance from the picker to activate or stop the transport can be different in different embodiments or can be adjusted as desired by the user, in some embodiments. Another predefined condition may include when the picker 250 stops moving, transport 10,510 will stop about 3 feet from the picker 250 and wait until the picker moves more than 3 feet away. Similarly, if the sensor data identifies an object in the terrain that the transport 10,510 can move around, controller 50,550 will send the necessary commands to move the transport around the object in the terrain so that the transport can continue to follow the picker. Still another predefined condition may involve the inclination sensor identifying the transport traveling at an undesirable angle, for example, up a hill, over an object, in uneven terrain, or across a hill. At such time, the controller may send the appropriate commands to slow down, move left, or move right to find a better path to travel. Similarly, the controller may instruct the transport 10,510 to increase or decrease the height of one or more corners of frame 20,520 with telescoping mechanism 80, or stop and signal user or control station of an undesirable terrain condition.

Throughout the day, the picker 250 will frequently stop and place picked produce on transport 10,510 to eventually create another predefined condition—to autonomously deliver the collected products to the distribution location. This predefined delivery or transport condition may be initiated by 1) the picker pressing the 'send' button on the transport or remote manual control device 128; 2) the picker entering a value (e.g., weight or amount of produce or items) into controller 50,550 for the produce placed on frame 20,520, or 3) controller 50,550 receiving a weighed value at platform 42,542 with pressure sensors 100*d*.

With the delivery condition activated, a transport 10,510 retraces the movements made when following picker 250 from the distribution location 210. Next, the collected produce is unloaded and new empty containers may be loaded onto transport 10 or 510. At such time, the control system 50 may also reset the weight data, for example, to zero. After unloading, the picker may hit a send button (not shown) in the controller 50,550 that provides the machine language instructions to the computer processor to actuate the mechanisms on the transport cause it to retrace where it came from and search for the picker once it arrives.

The route taken by transport 10 when transferring produce on a farm 200 to a distribution location 210 or when returning to a picker in a row 220 can be calculated by various known methods. It is understood that at least some of the functions performed by the transport 10 as described herein can also be functions that can be performed by the transport 510. In one embodiment, as described above, controller 50.550 may keep track of where the transport 10 or 510 has moved (track of movement 230) with the sensors and controller 50,550 recording every move and use that recorded data to return (e.g., each different movement made along its path from its origin, time and distance travelled, coordinates of destination, coordinates along path toward destination, and/or direction vector). The controller may be receiving updated positional or path related data which can be used to adjust the path of the transport in route to its destination.

In another embodiment, the controller 50,550 may use: 1) a coordinate map of the farm land and rows 240 created by GPS, a lidar unit or other location determining device, 2) the coordinates of a designated distribution location 210 on the map, or 3) the GPS coordinates of the picker 250 on the map to define the best route to travel between distribution location 210 and picker 250. With the latter embodiment, communication unit 130 (e.g., as show on FIG. 1) on transport 10,510 can send data received by the controller 50,550 from the various sensors 100 to the control station 260 on the farm 200, and control station 260 may use that data to track the location of the picker and distribution vehicle before dynamically instructing where and how the transport needs to move on the loaded coordinate map.

The data from the sensors 100 allows controller 50, 550 to decide how the semi-autonomous transport vehicle should move or travel on the farm 200. The controller may use the same sensor data to decide if an alert (e.g., audio, visual) needs to be sent to display 125 or control station 260 to indicate something is obstructing a path for the transport to move. For example, the alert can be used to alert the user that something is abnormal (e.g., the picker has not moved for an hour and perhaps help should be provided, a storm is approaching and they should leave the area, etc.).

The proximity sensors 100*a* detect when a picker has moved so that transport 10,510 can follow the picker as he works. The communication unit 130 also receives data from and sends data to the programing station 260 about GPS locations, weights of produced collected, location of employees, time employees arrived and stopped working, weather, errors with equipment, images of terrain, etc.

As transport 10,510 proceeds down a row to collect the picked produce from the picker. At some point, the transport 10,510 will encounter a non-row location or the end of the field. The end can be indicated by a physical barrier, by a communication link marker, GPS coordinates, or programed instructions. When the transport 10,510 reaches the end of a row, transport 10,510 can be programmed to stop.

Figure 4:
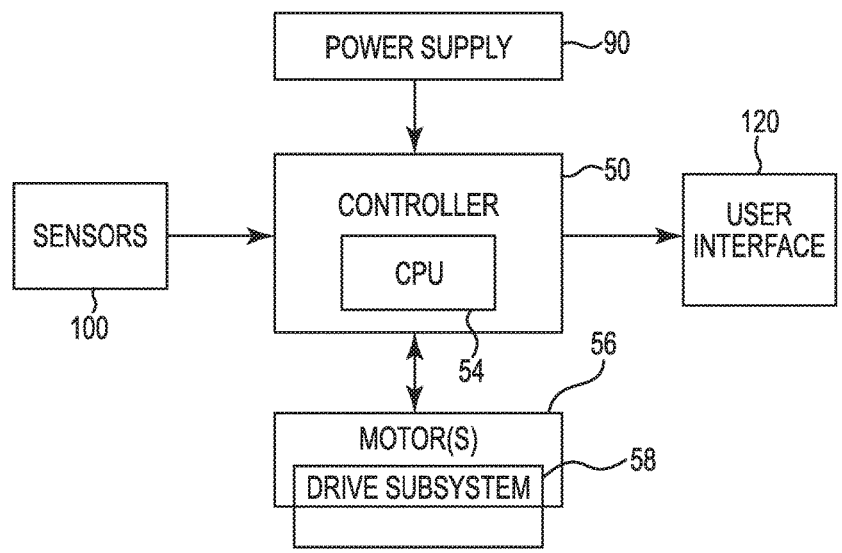
FIG. 4 provides a simplified block diagram illustrating components of a semi-autonomous transport vehicle control system for use with embodiments of the present disclosure.

FIG. 4 is a block diagram of the electrical components that allow the controller to operate the autonomous or semi-autonomous operations of transport 10,510. Each component is directly or indirectly coupled to power supply 90 through controller 50 (or controller 550). As discussed above, the controller receives and evaluates data from the components with a computer processor (CPU 54) to perform various programed tasks or movements. For example, the evaluated data will allow the transport to identify the movements of a worker or picker in the field, to move or stop the transport relative to the worker, to recognize changes in the terrain around the transport and to recognize or calculate the weight of the produce added to the transport.

In some embodiments, the transport 10, 510 will also share the received and evaluated data from the components with control station 260 by user interface 120 (e.g., display 125, manual drive device 128, and communication unit 130). Such data may include information about plant health, worker location, transport location, weather, orientation of transport, weight on transport, and/or other suitable information to be conveyed to a user about the system, the field being worked, and/or environment. This data will allow controller 50,550 to determine when to provide instruction to the motors to move or stop the transport within a row or to a distribution or non-row location, transmit a message on the display 125 and/or use the communication unit 130 to share data with the control station 260.

The control station can be a computing device having a processor, memory, and transmission and receiving components to be able to process the above information and provide information to the transport. For example, the control station can evaluate information, such as the weight, time, and/or speed, to evaluate if the picker and/or harvesting path is effective and to potentially improve the harvesting process in the future.

As shown in the embodiment of FIG. 4, the programed tasks or movements implemented by the controller 50 and CPU 54 after a predefined condition will control motors 56 and drive subsystem 58. Control motor 56 and drive subsystem 58 may maneuver the transport to a prescribed GPS location in the field. In some embodiments, the motors take the form of a differential drive comprising two coaxial wheels 30c and 30d. The wheels are driven together or independently by one or more motors 55, 555 and a drive train controlled by the drive subsystem 58.

User interface 120 allows the control station 260 to collect and record inventory, weather forecast details, GPS locations, and/or other information from the transport vehicles 10,510. Currently, farmers have very little information or data concerning how fast or efficient each picker is compared to others because such information is collected manually, which can be expensive. The transport and/or the control station may also be configured to know the position of the worker on the site, which then ties the production information with the location of each picker within the operation. This high granularity information gives growers a better picture of the state of their business and, by relating volumes to locations for each picker, enables growers to maintain plant quality, plant health, and picking process consistency, as well as operational efficiency.

As discussed above, the system can collect data about the harvesting process and this information is saved in memory. It can be used to determine the next movement of the transport. For example, a threshold distance from the picker can be maintained and this threshold can be set, for example, based on prior movements of the transport, by the user, by the manufacturer of the transport, or set by another suitable party. Similarly, the threshold weight can be set in these ways as well. Further, the transport may have a delay built into its movement such that it reviews historical data before it starts to move (e.g., to identify if mud has gotten on a sensor causing false proximity data, someone or an animal walking in front of a sensor, the picker falls and the proximity sensor believes they have moved beyond the threshold distance, etc.).

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Additionally, elements and components described herein may be further divided into additional components or joined together to form fewer components for performing the same functions.

The functions the transports are programmed to perform as described above may be implemented in software, hardware, firmware, or any combination thereof. The functions are preferably implemented in one or more computer programs executing on the programmable controller subsystem, which includes a processor, a storage medium readable by the processor (including, e.g., volatile and non-volatile memory and/or storage elements), and input and output devices (e.g., located within and/or outside the controller 50). Each computer program can, for example, be a set of instructions (program code) in a code module resident in a random access memory. Until required, the set of instructions may be stored in another computer memory (e.g., in a hard disk drive, or in a removable memory such as an optical disk, external hard drive, memory card, or flash drive) or stored on another computer system and downloaded via the Internet or other network.

What is claimed is:

1. A device for transporting produce picked by a picker from at least one row of plants in a field, comprising:
    a vehicle having a frame for carrying the picked produce from the at least one row of plants;
    at least three wheels coupled to the frame;
    at least one motor coupled to at least one of the wheels;
    a power unit connected to the frame;
    a number of sensors, wherein the number of sensors includes at least one proximity sensor coupled to both a front side and a back side of the frame to identify movement of the picker; and
    a control unit connected to the frame and coupled between the motor, at least one sensor, and a power unit to autonomously move the vehicle to follow the picker by sensing when the picker moves and autonomously stop the vehicle when the picker stops;
    memory to record movements of the vehicle following the picker;
    at least one produce sensor to sense a weight of picked produce placed on the vehicle;
    wherein the control unit is constructed to continue to follow the picker until the weight of picked produce reaches a threshold weight;
    wherein the control unit is constructed to autonomously move the vehicle when the weight of picked produce reaches a threshold weight to a distribution location based on retracing the recorded movements of the vehicle; and
    wherein the produce sensor is constructed to sense when the weight of the picked produce placed on the vehicle has been removed; and
    wherein the control unit is constructed to autonomously move the vehicle to retrace the recorded movements of the vehicle after the above element; and
    repeating the above.

2. The device of claim 1, wherein the control unit includes a computer processor to evaluate data received from the number of sensors to determine when to stop or move the wheels.

3. The device of claim 1, wherein the device includes four wheels coupled to the frame.

4. The device of claim 3, wherein the frame extends over the at least one row to allow two of the four wheels roll on one side of the row and the other two wheels roll on the other side of the row when transporting produce.

5. The device of claim 1, wherein the frame and the at least three wheels move between two row of plants.

6. The device of claim 1, further including a telescoping mechanism between the frame and wheels to increase or decrease a height of the frame over the ground.

7. The device of claim 1, wherein the device further includes an inclination sensor on the frame to allow the control unit to calculate an orientation of a surface of the frame relative to a horizontal plane.

8. The device of claim 1, further including a pressure sensor connected to the frame and coupled to the control unit to identify the weight of the picked produce on the frame.

9. The device of claim 1, further including at least two proximity sensors connected to the frame and coupled to the control unit to provide terrain data.

10. The device of claim 1, wherein the device further includes a lidar sensor connected to the frame and coupled to the control unit to map out the field as the device moves.

11. The device of claim 1, wherein the device further includes a communication link using WiFi, cellular, or RF.

12. The device of claim 1, wherein the frame includes a platform structure for carrying objects selected from a group including produce, containers, spraying equipment, and mowing equipment.

13. The device of claim 1, further including a deflection structure connected to the frame to prevent plants from contacting the frame.

14. The device of claim 1, further including a GPS unit.

15. The device of claim 1, further including a storage unit coupled to the frame.

16. The device of claim 1, further including a unique identification sensor connected to the frame and couple to the control unit to activate the device or recognize the picker.

17. The device of claim 1, further including a remote control unit to manually move or stop the device.

18. The device of claim 1, further including wherein identifying the movement of the picker includes identifying movement of the picker within at least one row of plants in a field.

19. A method of moving produce picked by a person from at least one row of plants in a field to a distribution location with a semi-autonomous transport vehicle having a platform, comprising:
  using a control unit to autonomously move the vehicle to the field location of the person in the at least one row to receive the picked produce on the platform;
  sensing with a proximity sensor on the vehicle when the person moves;
  using the control unit to autonomously move the vehicle to follow the person after sensing with the proximity sensor;
  recording the movements of the vehicle;
  using the control unit to autonomously stop the vehicle when the person stops;
  receiving weight data with a sensor on the vehicle to recognize received picked produce on the platform;
  repeating the above steps until a weight of picked produce placed on the vehicle reaches a maximum weight;
  autonomously transporting the received produce on the vehicle to the distribution location, by retracing the recorded movements of the vehicle, for removal when the weight data reaches a threshold value; and
  sensing when the weight of the picked produce placed on the vehicle has been removed and autonomously moving the vehicle to retrace the recorded movement after the above element; and
  repeating the above elements.

20. A system for moving produce picked by a person from at least one row of plants in a field to a distribution location, comprising:
  at least one semi-autonomous transport vehicle configured to:
    travel to a field location of the person in the at least one row to collect picked produce,
    sense when the person moves,
    autonomously move the vehicle to follow the person,
    record the movement of the vehicle,
    autonomously stop the vehicle when the person stops,
    sense when the produce placed on the transport vehicle,
    repeat the above steps until a weight of picked produce placed on the vehicle reaches a maximum weight,
    autonomously move the vehicle to retrace the recorded movements of the vehicle,
    sense when the weight of the picked produce placed on the vehicle has been removed and autonomously moving the vehicle to retrace the recorded movement after the above element; and
    repeating the above elements
    to the distribution location for removal.

21. The system of claim 20, wherein the vehicle travels to the at least one row location after receiving a GPS map location from a control station.

22. The system of claim 20, wherein each person of a number of persons has a machine-readable unique identifier, and the transport vehicle includes a device for reading the unique identifier.

23. The system of claim 20, wherein the transport vehicle communicates with a control station the sensed data related to the picked produce, the person and the transport vehicle location.

24. The system of claim 20, wherein the at least one transport vehicle comprises:
  a frame for carrying the picked produce from the at least one row of plants;
  at least three wheels coupled to the frame;
  at least one motor coupled to at least one of the wheels;
  a rechargeable power unit connected to the frame;
  at least one proximity sensor coupled to both a front side and a back side of the frame to identify movement of the person in the at least one row; and
  a control unit connected to the frame and coupled between the motor, sensors and rechargeable power unit to autonomously move the transport vehicle when the sensors identify a predefined condition in the field.

25. A method for an electric transport vehicle to autonomously follow a person picking produce, the method comprising:
  sensing when the person moves using sensors located on the vehicle;
  autonomously moving the vehicle to follow the person;
  recording the movements of the vehicle;
  autonomously stopping the vehicle when the person stops;
  sensing picked produce placed on the vehicle;
  repeating the above steps until a weight of picked produce placed on the vehicle reaches a maximum weight; and
  autonomously moving the vehicle to retrace the recorded movements of the vehicle;
  sensing when the weight of the picked produce placed on the vehicle has been removed and autonomously moving the vehicle to retrace the recorded movements of the vehicle after the above step; and
  repeating the above steps.

\* \* \* \* \*